US012652339B2

(12) United States Patent
Singh et al.

(10) Patent No.: US 12,652,339 B2
(45) Date of Patent: Jun. 9, 2026

(54) METHODS AND SYSTEMS FOR MANAGING MULTIPATH COMMUNICATION

(71) Applicant: SAMSUNG ELECTRONICS CO., LTD., Suwon-si (KR)

(72) Inventors: Sukhdeep Singh, Bangalore (IN); Madhan Raj Kanagarathinam, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/380,980

(22) Filed: Oct. 17, 2023

(65) Prior Publication Data

US 2024/0048640 A1     Feb. 8, 2024

Related U.S. Application Data

(63) Continuation of application No. PCT/KR2022/005949, filed on Apr. 26, 2022.

(30) Foreign Application Priority Data

Apr. 29, 2021     (IN) .............................. 202141019736

(51) Int. Cl.
*H04L 12/18* (2006.01)
*H04L 67/62* (2022.01)

(52) U.S. Cl.
CPC ............ *H04L 67/62* (2022.05); *H04L 12/185* (2013.01); *H04L 12/1881* (2013.01)

(58) Field of Classification Search
CPC ... H04L 67/62; H04L 12/185; H04L 12/1881; H04L 61/4511; H04L 61/58; H04L 69/169; H04L 69/14
See application file for complete search history.

(56) References Cited

U.S. PATENT DOCUMENTS 7,440,493 B2 * 10/2008 Pietila .................... G01S 19/22
                                                    375/150
8,400,923 B2 3/2013 Kini
                    (Continued)

FOREIGN PATENT DOCUMENTS

EP          3 585 009 B1     3/2021
KR     10-2014-0098379 A     8/2014
                    (Continued)

OTHER PUBLICATIONS

International Search Report and Written Opinion issued Aug. 1, 2022 by the International Searching Authority in counterpart International Patent Application No. PCT/KR2022/005949. (ISA/220, ISA/210 and ISA/237).
                    (Continued)

*Primary Examiner* — Umar Cheema
*Assistant Examiner* — Adam A Cooney
(74) *Attorney, Agent, or Firm* — Sughrue Mion, PLLC

(57)              ABSTRACT

A method managing multipath communication includes acquiring a plurality of network addresses respectively corresponding to a plurality of servers associated with a domain, sending a data request to at least one server of the plurality of servers based on the acquired plurality of network addresses, receiving a first data packet transmitted from a first server of the plurality of servers in response to the data request, the first data packet being received first in order among a plurality of data packets received from the plurality of servers in response to the data request, accepting the first data packet, and rejecting data packets transmitted from each server of the plurality of servers other than the first server.

18 Claims, 14 Drawing Sheets

(56)                References Cited

U.S. PATENT DOCUMENTS

| | | | | |
|---|---|---|---|---|
| 8,964,757 | B2 | 2/2015 | Watson et al. | |
| 10,659,569 | B1* | 5/2020 | Tourrilhes | H04L 61/2514 |
| 2004/0123140 | A1 | 6/2004 | Toomey | |
| 2012/0166639 | A1* | 6/2012 | Hoynowski | H04L 61/4511 |
| | | | | 709/224 |
| 2014/0143301 | A1* | 5/2014 | Watson | H04L 65/80 |
| | | | | 709/203 |
| 2014/0362765 | A1* | 12/2014 | Biswas | H04L 45/24 |
| | | | | 370/328 |
| 2015/0063211 | A1* | 3/2015 | Kim | H04L 45/24 |
| | | | | 370/328 |
| 2015/0281367 | A1 | 10/2015 | Nygren et al. | |
| 2016/0099963 | A1* | 4/2016 | Mahaffey | H04L 63/166 |
| | | | | 726/25 |
| 2017/0063699 | A1* | 3/2017 | Kim | H04L 47/2491 |
| 2017/0111311 | A1 | 4/2017 | Bouazizi et al. | |
| 2017/0289976 | A1* | 10/2017 | Lai | H04W 28/02 |
| 2017/0290036 | A1* | 10/2017 | Han | H04W 28/0865 |
| 2017/0339257 | A1* | 11/2017 | Kanagarathinam | H04L 45/124 |
| 2017/0359855 | A1* | 12/2017 | Jiao | H04W 88/12 |
| 2018/0007569 | A1* | 1/2018 | Rosa | H04W 28/0236 |
| 2018/0041570 | A1* | 2/2018 | Svedberg | H04L 67/1031 |
| 2018/0234335 | A1* | 8/2018 | Sridhar | H04L 69/163 |
| 2018/0262419 | A1* | 9/2018 | Ludin | H04L 45/24 |
| 2019/0068694 | A1* | 2/2019 | Ripke | H04L 47/125 |
| 2019/0363974 | A1* | 11/2019 | Wang | H04L 67/562 |
| 2020/0007905 | A1* | 1/2020 | Han | H04L 41/0803 |
| 2020/0028919 | A1 | 1/2020 | Yang et al. | |
| 2020/0076678 | A1* | 3/2020 | Hao | H04L 41/0654 |
| 2020/0220805 | A1* | 7/2020 | Dhanabalan | H04L 49/90 |
| 2020/0396200 | A1* | 12/2020 | Kumar | H04L 69/163 |
| 2021/0385169 | A1* | 12/2021 | Urman | H04L 1/08 |
| 2022/0109622 | A1* | 4/2022 | Yeh | H04L 69/40 |
| 2022/0321455 | A1* | 10/2022 | Xiao | H04L 69/14 |
| 2023/0224795 | A1* | 7/2023 | Hu | H04L 45/24 |
| | | | | 370/328 |
| 2023/0283694 | A1* | 9/2023 | Kang | H04L 67/141 |
| | | | | 370/356 |
| 2024/0163204 | A1* | 5/2024 | Wang | H04L 1/1854 |

FOREIGN PATENT DOCUMENTS

| | | |
|---|---|---|
| KR | 10-2016-0090477 A | 8/2016 |
| KR | 10-2055849 B1 | 12/2019 |
| WO | 2019/014426 A1 | 1/2019 |

OTHER PUBLICATIONS

Communication issued on Aug. 21, 2024 by the European Patent Office for European Patent Application No. 22796104.2.

Communication dated Dec. 12, 2022, issued by Intellectual Property India in Indian Application No. 202141019736.

Communication dated Mar. 21, 2025, issued by the European Patent Office in counterpart European Application No. 22796104.2.

Communication issued Nov. 11, 2025 by the European Patent Office for EP Patent Application No. 22796104.2.

Communication dated Apr. 24, 2026, issued by the China National Intellectual Property Administration in Chinese Application No. 202280031958.X.

"The problems to be noted and solved by Content Delivery Network (CDN) in 5G", Electronics World 08, Apr. 23, 2019 (3 pages total).

* cited by examiner

MP_CAPABLE

MP_CAPABLE

MP_CAPABLE

202e

206

202a

MP_CAPABLE

MP_CAPABLE

202f

MP_CAPABLE

MP_CAPABLE

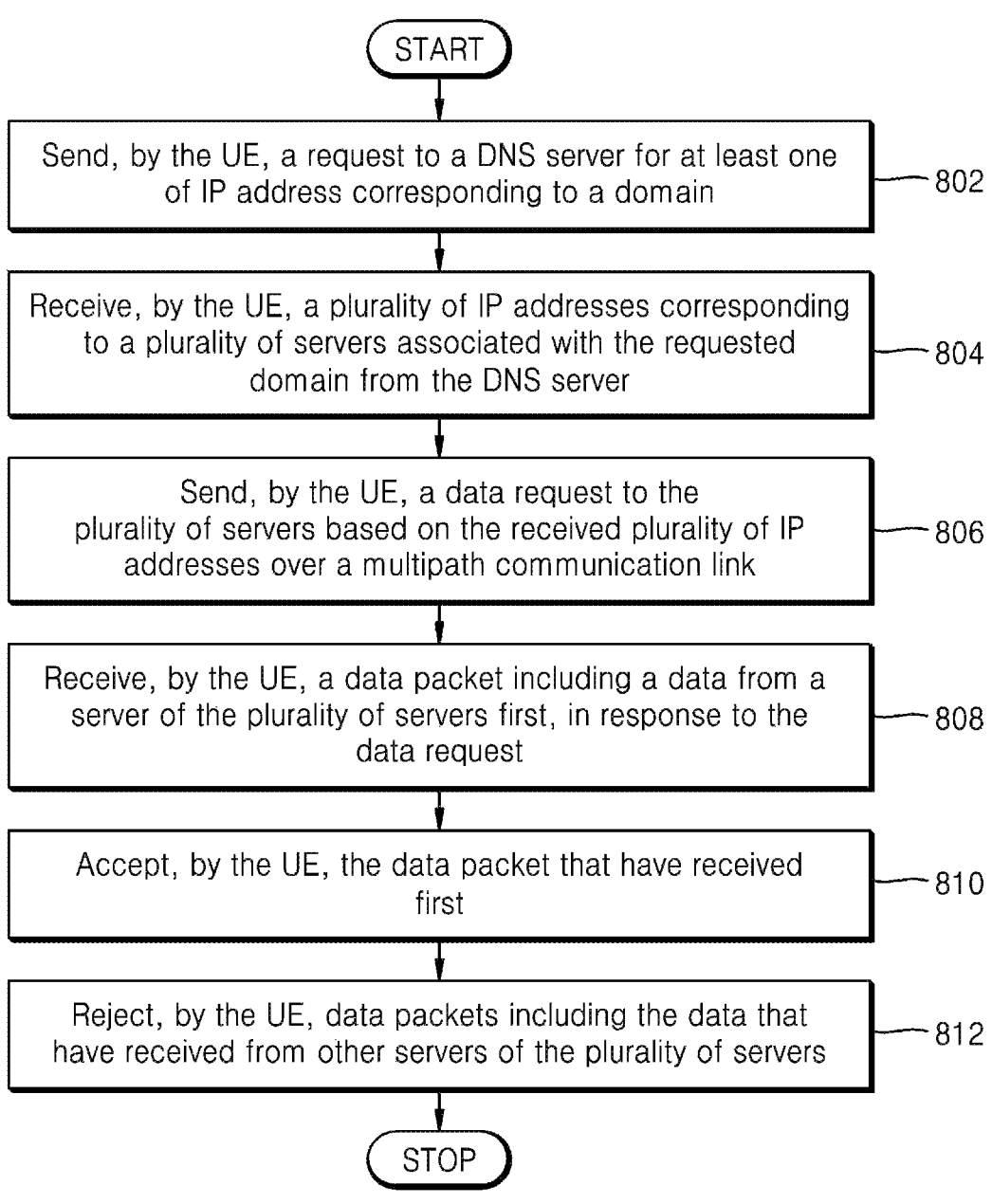

START

Send, by the UE, a request to a DNS server for at least one of IP address corresponding to a domain — 802

Receive, by the UE, a plurality of IP addresses corresponding to a plurality of servers associated with the requested domain from the DNS server — 804

Send, by the UE, a data request to the plurality of servers based on the received plurality of IP addresses over a multipath communication link — 806

Receive, by the UE, a data packet including a data from a server of the plurality of servers first, in response to the data request — 808

Accept, by the UE, the data packet that have received first — 810

Reject, by the UE, data packets including the data that have received from other servers of the plurality of servers — 812

STOP

FIG. 9

METHODS AND SYSTEMS FOR MANAGING MULTIPATH COMMUNICATION

CROSS-REFERENCE TO RELATED APPLICATIONS

This application is a bypass continuation application of International Patent Application No. PCT/KR2022/005949, filed on Apr. 26, 2022, which is based on and claims priority to Indian Patent Application No. 202141019736, filed on Apr. 29, 2021 with the Indian Patent Office, the disclosures of each of which are incorporated by reference herein in their entireties.

FIELD

The present disclosure relates to the field of multipath communication and more particularly to managing the multipath communication by exploiting availability of a plurality of servers.

DESCRIPTION OF RELATED ART

Multipath communication enables a User Equipment (UE) to use one or more network interfaces in parallel or one at a time for a single flow to a server. Examples of the multipath communication may be, but are not limited to, Multipath Transmission Control Protocol (MPTCP) communication, Multipath User Datagram Protocol (MPUDP) communication, Multipath Quick UDP Internet Connections (MPQUIC) communication, and so on. Examples of the network interfaces may be, but are not limited to, a Long Term Evolution (LTE) network, a New Radio/5G network, Wireless Fidelity (Wi-Fi), and so on. The flow corresponds to one or more activities being performed by the UE such as, without limitation, downloading data, uploading data, streaming audio and/or video sessions, and so on. Each flow may comprise a plurality of subflows, which indicate the network interfaces being used by the UE for the single flow to the server.

SUMMARY

The embodiments disclosed herein provide methods and systems for managing multipath communication.

In accordance with certain embodiments of the present disclosure, a method is provided for managing multipath communication by a user equipment (UE). The method includes acquiring a plurality of network addresses respectively corresponding to a plurality of servers associated with a domain; sending a data request to at least one server of the plurality of servers based on the acquired plurality of network addresses; receiving a first data packet transmitted from a first server of the plurality of servers in response to the data request, the first data packet being received first in order among a plurality of data packets received from the plurality of servers in response to the data request; accepting the first data packet; and rejecting data packets transmitted from each server of the plurality of servers other than the first server.

In accordance with certain embodiments of the present disclosure, a user equipment (UE) is provided for managing multipath communication. The UE includes at least one communication interface, at least one memory storing a plurality of instructions and a processing circuitry configured to execute the plurality of instructions to acquire a plurality of network addresses respectively corresponding to a plurality of servers associated with a domain, send a data request through the at least one communication interface to at least one server of the plurality of servers based on the acquired plurality of network addresses, receive a first data packet transmitted from a first server of the plurality of servers in response to the data request, the first data packet being received first in order among a plurality of data packets received from the plurality of servers in response to the data request, accept the first data packet, and reject data packets transmitted from each server of the plurality of servers other than the first server.

In accordance with certain embodiments of the present disclosure, a non-transitory computer-readable recording medium is provided. The recording medium has recorded thereon instructions executable by at least one processor to acquire a plurality of network addresses respectively corresponding to a plurality of servers associated with a domain; send a data request to at least one server of the plurality of servers based on the acquired plurality of network addresses; receive a first data packet transmitted from a first server of the plurality of servers in response to the data request, the first data packet being received first in order among a plurality of data packets received from the plurality of servers in response to the data request; accept the first data packet; and reject data packets transmitted from each server of the plurality of servers other than the first server.

BRIEF DESCRIPTION OF THE DRAWINGS

Embodiments herein are illustrated in the accompanying drawings, throughout which like reference letters indicate corresponding parts in the various figures. The embodiments herein will be better understood from the following description with reference to the drawings, in which:

FIGS. 2A, 2B and 2C are diagrams depicting a communication system, according to exemplary embodiments as disclosed herein;

FIG. 5 is a sequence diagram depicting a method for managing the multipath communication based on proxy addresses, according to exemplary embodiments as disclosed herein;

FIG. 6 is a sequence diagram depicting a method for managing the multipath communication using a DNS cache, according to exemplary embodiments as disclosed herein;

FIG. 8 is a diagram depicting a method for managing the multipath communication, according to exemplary embodiments as disclosed herein; and FIG. 9 is a diagram depicting socket mapping in Transport Control Protocol (TCP) and multipath TCP, according to exemplary embodiments as disclosed herein.

DETAILED DESCRIPTION

Figure 1A:
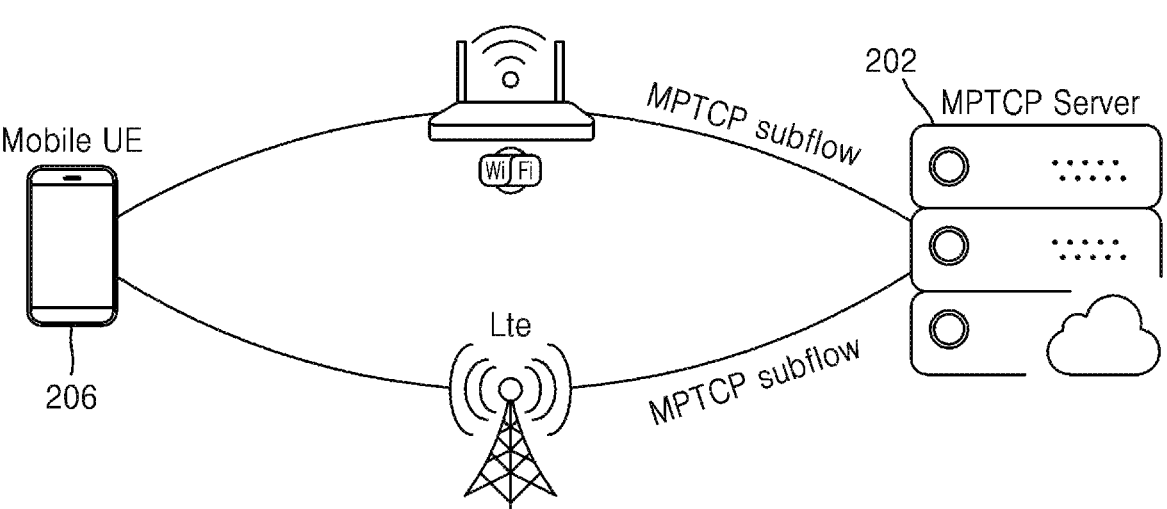
FIG. 1A is a diagram depicting Multipath Transmission Control Protocol (MPTCP) subflows in an example environment.

Aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

Embodiments herein disclose methods and systems for managing multipath communication by exploiting availability of a plurality of servers. Referring now to the drawings, and more particularly to FIGS. 2A through 9, where similar reference characters denote corresponding features consistently throughout the figures, there are shown example embodiments.

Embodiments herein use the terms "multi-path communication", "multi-pathing solutions", "multi-path protocols", "multi-path communication link", and so on interchangeably to refer to a communication protocol that enables at least one User Equipment (UE) to utilize multiple network interfaces, in parallel, for a flow to a server.

Embodiments herein use the terms such as "flow", "activity", "service", "session", and so on, interchangeably to refer to an action performed by the at least one UE. Examples of the action may be, but are not limited to, downloading data, uploading data, streaming audio and/or video sessions and so on.

Embodiments herein use the terms "sub-flow" or "subflow", "network interface", "communication interface", "wireless radio interface", and so on interchangeably to refer to a Radio Access Technology (RAT) used by the at least one UE to perform the flow.

Embodiments herein use the terms "domain", "domain name", "Uniform Resource Locator (URL)", "host name", and so on interchangeably to refer to a label, which may be assigned to a server and may be used for identification of the server in various forms of electronic communication.

Embodiments herein use the terms "data", "data packets", "data traffic", and so on interchangeably to refer to data related to one or more applications. The data may include at least one of media (audio, video, images, or the like), text, files, and so on.

FIG. 1A is a diagram depicting example MPTCP subflows in an example environment. The MPTCP communication, an example of the multipath communication, allows multiple subflows between the UE 206 and the server 202 (for example; a MPTCP server). The MPTCP connection starts with an initial/first subflow similar to a regular Transport Control Protocol (TCP) connection. Once the first subflow is established, additional subflows may be added into the established connection, as depicted in FIG. 1A. Data between the UE and the MPTCP server may flow over any of active and capable subflows.

For example, consider that the UE 206 supports two network interfaces an LTE interface, and Wi-Fi, as depicted in FIG. 1A, wherein each of the two network interfaces binds to its own Internet Protocol (IP) address, such that if the MPTCP server 202 is a single-homed server, each of the two network interfaces may have the same IP address. In such a scenario, the MPTCP communication enables the UE to use both the LTE interface and the Wi-Fi to communicate with the MPTCP server 202 regardless of application and corresponding characteristics.

In various approaches, components such as a path manager (PM) and a scheduler may be used for managing the MPTCP communication/multipath communication between the UE 206 and the MPTCP server 202. The PM manages establishment of the subflows between the UE 206 and the MPTCP server 202. The scheduler manages exchange of data between the UE 206 and the MPTCP server 202 among the subflows. The scheduler may be modular and operate in different modes:

Default: In the default mode, the scheduler first sends the data on the subflows with the lowest Round Trip Time (RTT) until their congestion window is full. The scheduler then starts transmitting the data on the subflows with the next higher RTT.

Round Robin: In the round robin mode, the scheduler transmits the data in a round-robin fashion. However, in the round robin mode, performance of the scheduler may be degraded.

Redundant: In the redundant mode, the scheduler transmits the data on the available subflows in a redundant way.

Figure 1B:
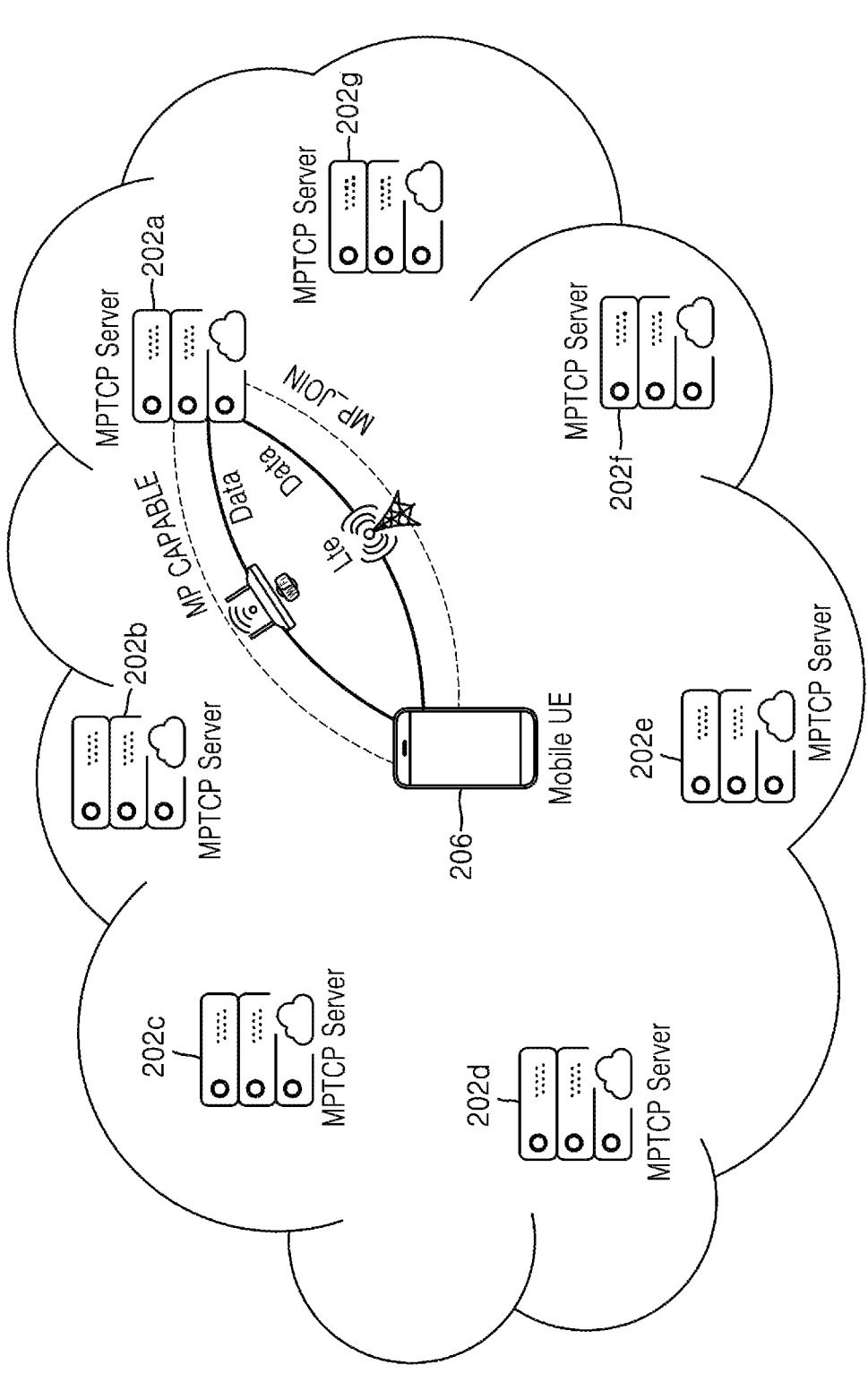
FIGS. 1B, 1C, and 1D are diagrams depicting a redundant mode of MPTCP operation, according to exemplary embodiments as disclosed herein.

Consider an example scenario, as depicted in FIG. 1B, wherein multiple servers 202a to 202g in a CDN (Content Delivery Network) are located across various geographical locations and the UE 206 supports the LTE interface and the Wi-Fi. In such a scenario, the UE 206 may use a MP_CAPABLE on the Wi-Fi and a MP_JOIN on the LTE interface to connect with the server 202a of the multiple servers 202a to 202g. However, in such approaches, the multipath communication/MPTCP communication restricts the UE 206 to use of the same server 202a for the data, namely, the server 202a to which both the Wi-Fi and the LTE connect. Thus, latency is increased.

Further, the UE 206 may be able to connect only to server 202a among the multiple servers 202a to 202g, since Transport Control Protocol (TCP) sequence number synchronization is a requirement of MPTCP communication/multipath communication. As different servers may be configured on different hardware, synchronization of all servers at layer 4 may be impossible or highly impractical. However, for redundant layer 4 operation, each server may access an independent node (i.e., independent TCP/MPTCP sequencing).

Figure 1C:
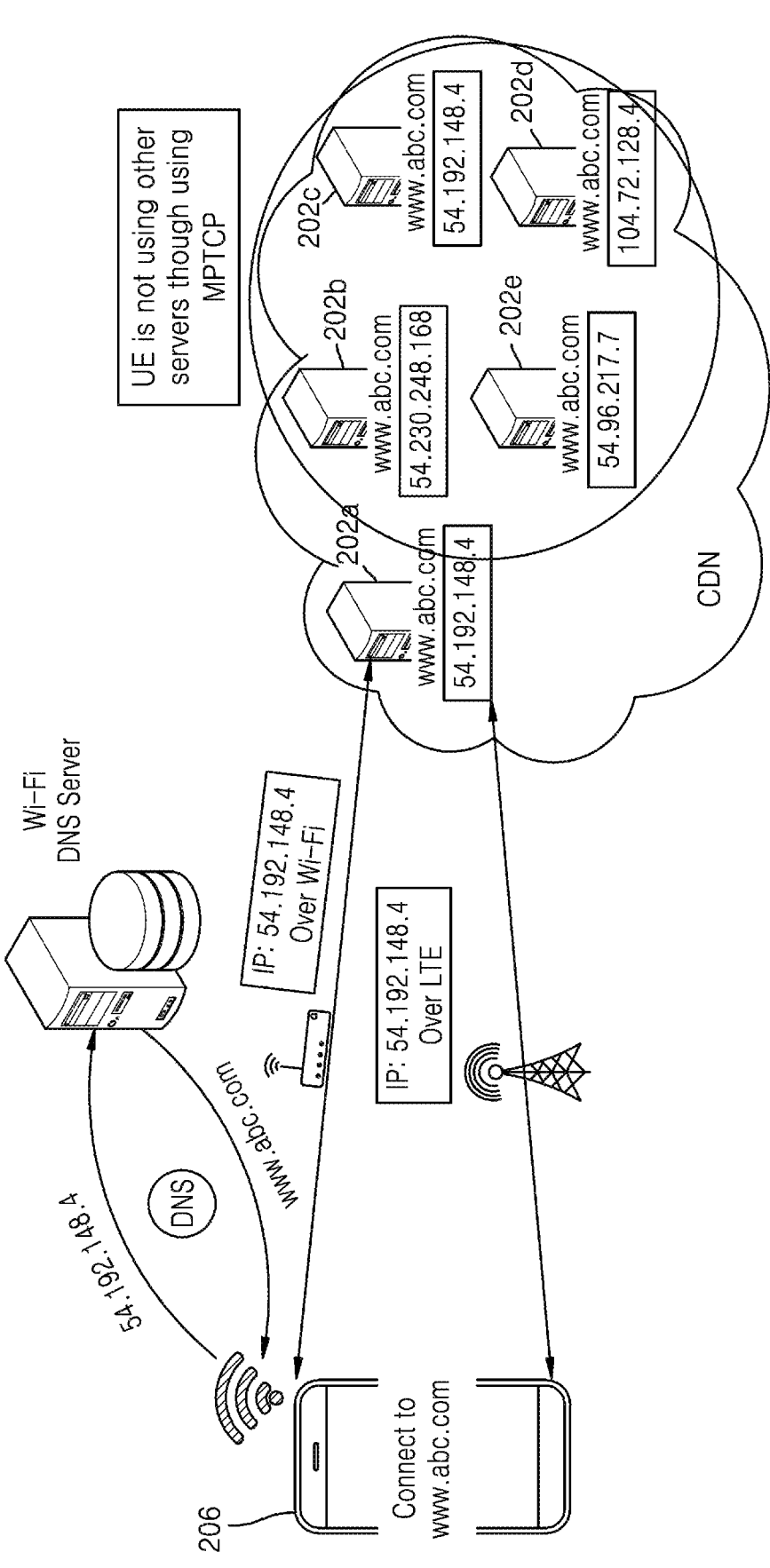
Figure 1D:
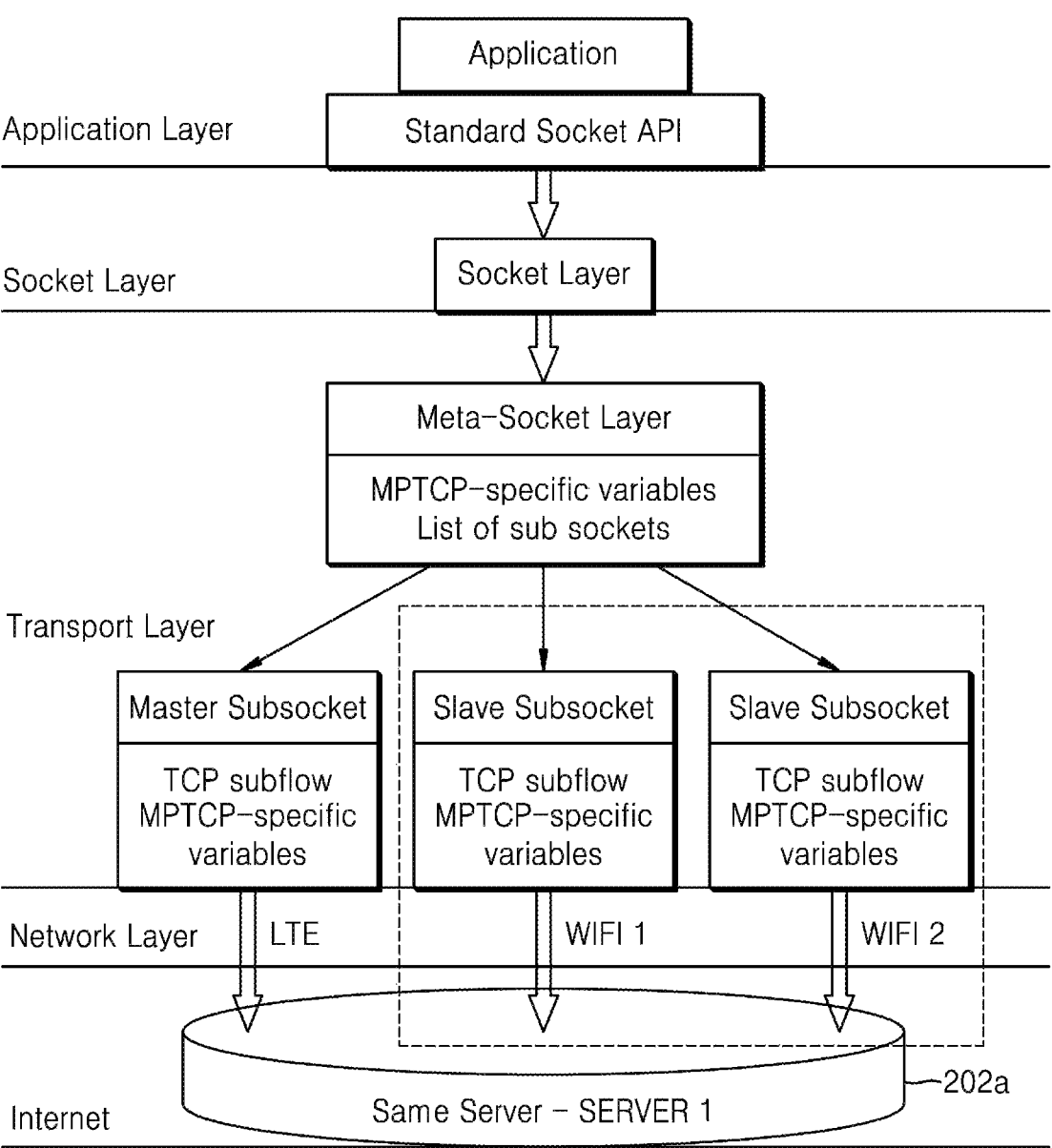

Consider an example scenario, as depicted in FIG. 1C, wherein five servers 202a to 202e are located across various geographic locations. However, in such approaches, the MPTCP communication/multipath communication may enable the UE 206 to connect to only one server 202a of the five servers 202a to 202e, even though all five servers 202a to 202e are available. The UE 206 may connect only to server 202a, in, for example, a manner depicted in FIG. 1D.

Thus, such approaches may increase end-to-end latency, as the UE 206 is restricted to connecting to only one server 202a, irrespective of availability of the multiple servers 202a to 202e. Improvement on such approaches is therefore desired.

Figure 2A:
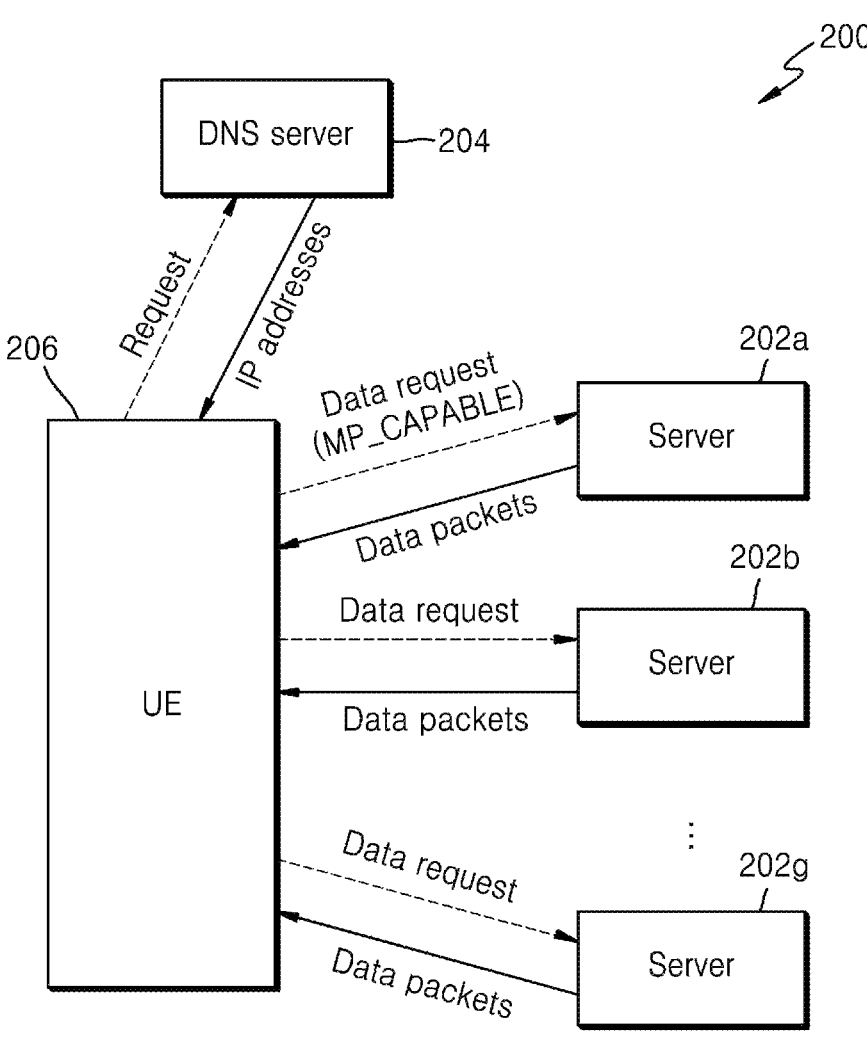
Figure 2B:
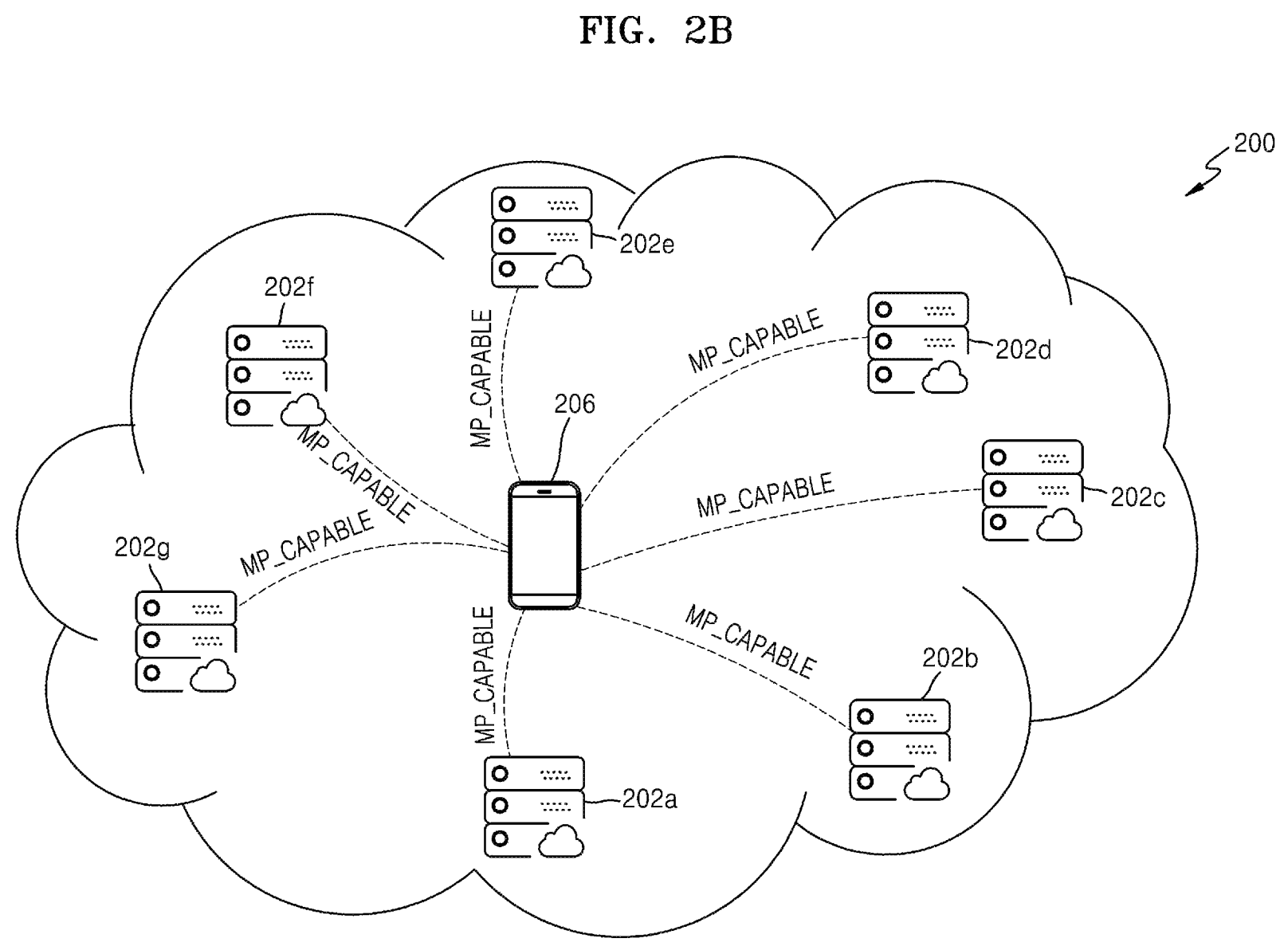
Figure 2C:
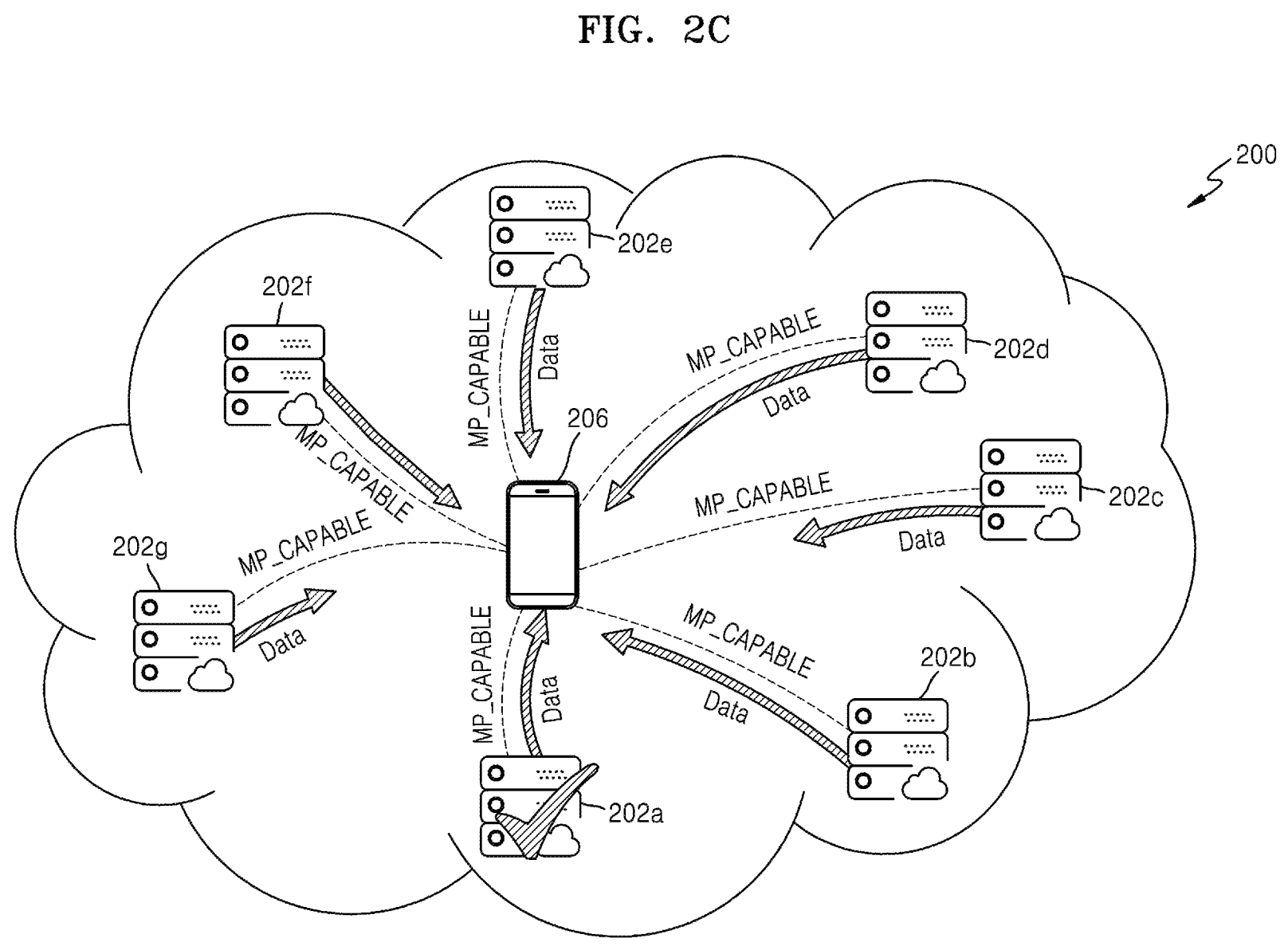

FIGS. 2A, 2B and 2C are diagrams depicting a communication system 200, according to embodiments as disclosed herein. The communication system 200 referred herein provides a multipath enabled controlled environment for enabling/deploying multipath communication in at least one User Equipment (UE). Examples of the multipath communication may be, but are not limited to, Multipath Transmission Control Protocol (MPTCP) communication, Multipath User Datagram Protocol (MPUDP) communication, Multipath Quick UDP Internet Connections (MPQUIC) communication, and so on. The multipath communication enables the at least one UE to use one or more of a plurality of network interfaces, in parallel or one at a time, for a single flow to a server. The flow may correspond to an activity being performed by the at least one UE. Examples of the activity may be, but are not limited to, downloading data, uploading data, streaming audio and/or video sessions and so on. Each flow may comprise a plurality of sub-flows, wherein each sub-flow corresponds to each network interface being used for the flow. The multipath communication increases network capacity and reliability as well as providing seamless fail over by facilitating multipath operation at a transport layer.

The communication system 200 includes a plurality of servers 202a to 202g, a Domain Name System (DNS) server 204, and at least one of User Equipments (UEs) 206. The plurality of servers 202a to 202g, the DNS server 204, and the UE 206 may communicate with each other using the one or more network interfaces. Examples of the network interfaces may be, but are not limited to, 3rd Generation Partnership Project (3GPP), a Long Term Evolution (LTE/4G), an LTE-Advanced (LTE-A), a Wi-Fi (IEEE 802.11), an Evolved UMTS Terrestrial Radio Access (E-UTRA), 5G based wireless communication systems, 4G based wireless communication systems, a 5G-unlicensed, a 5G-licensed, a Wi-Fi Direct, and so on.

The plurality of servers 202a to 202g referred herein may be configured to enable the UE 206 to perform the flow. The plurality of servers 202a to 202g may include at least one of, without limitation, network servers, content delivery networks (CDNs), and so on. Examples of the plurality of servers 202a to 202g may be, but are not limited to, an application server, a database/data server, a media server, a web server, an enterprise server, a gaming server, and so on. In an example, if the UE 206 is downloading data (an example of the flow), the plurality of servers 202a to 202g may include at least one of the data server, the web server, or any other type of server which stores the data. In another example, if the UE 206 is streaming video (an example of the flow), the plurality of servers 202a to 202g may include the media/video server, or any other type of server which belongs to a video provider.

The plurality of servers 202a to 202g may be associated with a domain/host name. The domain/host name is a label assigned to each of the plurality of servers 202a to 202g, which may be used to identify the plurality of servers 202 in various forms of electronic communication. In an example, the plurality of servers 202a to 202g may be associated with the same domain. In another example, the plurality of servers 202a to 202g may be associated with the different domains.

The DNS server 204 referred herein may provide a database, which stores Internet Protocol (IP) addresses of the plurality of servers 202a to 202g and their associated domains/hostnames. Alternatively, the database may store proxy addresses of proxy servers. The DNS server 204 may be configured to receive a query from a proxy client module 404 (see FIG. 4) for the proxy addresses (IP addresses) of the proxy servers, in the case of a proxy model. The DNS server 204 responds to the query of the proxy client module 404 (see FIG. 4) by providing the proxy addresses of the proxy servers, wherein the proxy client module 404 (see FIG. 4) stores the proxy addresses of the proxy servers/serving proxy. The DNS server 204 may therefore be described as a type of address lookup server.

The DNS server 204 may be configured to provide the IP addresses of the plurality of servers 202a to 202g corresponding to the one or more domains to the UE 206, based on receiving a request from the UE 206 for the IP addresses related to the one or more domains. The request sent by the UE 206 to the DNS server 204 for the IP addresses may be defined in accordance with RFC 1034, Domain Names—Concepts and Facilities.

It is here noted that the principles disclosed herein are applicable to networks using other network addressing protocols. However, an Internet Protocol (IP) network using DNS support will be assumed hereinafter for convenience of description.

The UE 206 referred herein may be a device, which performs the one or more flows with the plurality of servers 202a to 202g using the multipath communication. Examples of the UE 206 may be, but are not limited to, a mobile phone, a smartphone, tablet, a phablet, a personal digital assistant (PDA), a laptop, a computer, a wearable computing device, a vehicle infotainment device, an Internet of Things (IoT) device, a medical equipment, processing devices connected to wireless modems, or any other device that supports the multipath communication.

The UE 206 supports the plurality of network interfaces such as, without limitation, 3rd Generation Partnership Project (3GPP), a Long Term Evolution (LTE/4G), an LTE-Advanced (LTE-A), a Wi-Fi (IEEE 802.11), an Evolved UMTS Terrestrial Radio Access (E-UTRA), 5G based wireless communication systems, 4G based wireless communication systems, a 5G-unlicensed, a 5G-licensed, a Wi-Fi Direct, and so on, for performing the one or more flows with the plurality of servers 202a to 202g using the multipath communication.

The UE 206 includes one or more applications that enables the UE 206 to perform the one or more flows with the plurality of servers 202a to 202g using the multipath communication. Examples of the one or more applications may be, but are not limited to, a streaming application, a gaming application, a file downloading application, a voice call application, a media related application, an autonomous driving related application, and so on.

In an embodiment, the UE 206 may be configured to operate in an asynchronous redundant multipath mode for managing the multipath communication with the plurality of servers 202a to 202g for the one or more flows. The asynchronous redundant multipath mode enables the UE 206 to manage the multipath communication by exploiting availability of the plurality of servers 202a to 202g.

The UE 206 may enable the asynchronous redundant multipath mode based on at least one of a global mode/ method, socket options, a control driven method, an auto detection method, and a neural network method.

In the global mode/method, the UE 206 checks a proc file system (procfs) that comprises one or more sysfs variables to enable the asynchronous redundant multipath mode. In an example, if the multipath communication includes the MPTCP communication, the sysfs variable includes "/proc/sys/net/mptcp/mptcp arm". If the sysfs variable is set to '1' for the one or more applications, the UE 206 enables the asynchronous redundant multipath mode for the corresponding applications. If the sysfs variable is set to '0' for the one or more applications, the UE 206 disables the asynchronous redundant multipath mode for the corresponding applications.

For enabling the asynchronous redundant multipath mode, the UE 206 checks if the socket option (for example: setsockopt(fd, SOL TCP, MPTCP ARM ENABLED, & enable, size of (enable)) is enabled/set. If the socket option is enabled/set for the one or more applications, the UE 206 enables the asynchronous redundant multipath mode for the corresponding applications.

In the control driven method, the UE 206 checks for a list of applications that have been whitelisted by a proxy or the server 202. The UE 206 receives the list of applications from the server 202. The UE 206 populates the applications, which have to be allowed or whitelisted. The UE 206 adds an application user identifier (UID) of the applications that have been whitelisted to an allowed list. The UE 206 may maintain the UID corresponding to each application, which uniquely identifies the respective application. The UE 206 uses the UID for distinguishing the applications. The UE 206 then enables the asynchronous redundant multipath mode for the applications that have been whitelisted.

In the auto detection method, the UE 206 enables the asynchronous redundant multipath mode for the one or more applications that have characteristics such as, without limitation, maximum segment size (MSS) of smaller value compared to MSS of other applications, interval arrival time closer to Retransmission (RTO) time, and so on.

In the neural network method, the UE 206 trains a neural network to determine behavior of the applications based on at least one of, without limitation, the global mode, the socket options, the control driven method, the auto detection method, and so on. The UE 206 enables the asynchronous redundant multipath mode for the applications based on the determined behavior of the applications. Examples of the neural network may be, but are not limited to, a machine learning (ML), a convolutional neural network (CNN), a deep neural network (DNN), a recurrent neural network (RNN), a restricted Boltzmann Machine (RBM), a deep belief network (DBN), a bidirectional recurrent deep neural network (BRDNN), generative adversarial networks (GAN), a deep Q-networks, an Artificial Intelligence (AI) model, a regression based neural network, and so on. The neural network includes a plurality of nodes, which may be arranged in layers. Examples of the layers may be, but are not limited to, a convolutional layer, an activation layer, an average pool layer, a max pool layer, a concatenated layer, a dropout layer, a fully connected layer, a SoftMax layer, and so on. A topology of the layers may vary based on the type of the neural network. In an example, the neural network may include an input layer, an output layer, and a hidden layer. The input layer receives an input (for example: information related to the enabling/disabling of the asynchronous redundant mode based on at least one of the global mode, the socket options, the control driven method, the auto detection method, and so on) and forwards the received input to the hidden layer. The hidden layer transforms the input received from the input layer into a representation, which may be used for generating the output in the output layer. The hidden layers extract useful/low level features from the input, introduce non-linearity in the network and reduce a feature dimension to make the features equivariant to scale and translation. The nodes of the layers may be fully connected via edges to the nodes in adjacent layers. The input received at the nodes of the input layer may be propagated to the nodes of the output layer via an activation function that calculates the states of the nodes of each successive layer in the network based on coefficients/weights respectively associated with each of the edges connecting the layers.

Embodiments herein enable the UE 206 to manage the multipath communication based on dynamic update and a DNS cache 408 (see FIG. 4), while operating in the asynchronous redundant multipath mode.

For managing the multipath communication, the UE 206 identifies a trigger initiated by the one or more applications included in the UE 206 to perform the one or more flows with a server of the plurality of servers 202a to 202g. The trigger may indicate a domain for performing the one or more flows. On identifying the trigger initiated by the one or more applications, the UE 206 sends the request to the DNS server 204 for the plurality of IP addresses corresponding to the domain (indicated by the trigger of the one or more applications).

In response to the sent request, the UE 206 receives the plurality of IP addresses of the plurality of servers 202a to 202g associated with the requested domain from the DNS server 204. The UE 206 thereby acquires plurality of IP addresses of the plurality of servers 202a to 202g. The UE 206 stores the received IP addresses of the plurality of servers 202a to 202g in the DNS cache 408 with respect to the domain or the one or more applications.

When the one or more applications enable the UE 206 to perform a flow with the server 202 with respect to the domain, the UE 206 fetches the plurality of IP addresses of the plurality of servers 202a to 202g stored in the DNS cache for the domain. The UE 206 sends a data request to the plurality of servers 202a to 202g corresponding to the plurality of IP addresses (that have been fetched from the DNS cache), substantially in parallel/simultaneously, as depicted in FIG. 2B. In an example, the data request may be a multipath capable (MP_CAPABLE) request, which indicates that the UE 206 supports the multipath communication. The data request may be sent in various embodiments to all of the plurality of servers 202a to 202g, or to at least one of the plurality of servers 202a to 202g corresponding to a selected IP address of the plurality of IP addresses.

In an embodiment, the UE 206 sends the data request to the plurality of servers 202a to 202g by sending a single data request that indicates the plurality of IP addresses for the plurality of servers 202a to 202g to at least one of the plurality of servers. In another embodiment, the UE 206 sends the data request to each of the plurality of servers 202a to 202g substantially simultaneously. For example, the UE 206 may send each of the plurality of data requests to a corresponding one of the plurality of servers 202a to 202g one after the other, or in parallel.

The UE 206 may use a single network interface to send the data request to the plurality of servers 202a to 202g (that is, a homogeneous data request). Alternatively, the UE 206 may use a plurality of network interfaces to send the data request to the plurality of servers 202a to 202g (that is, a heterogeneous data request).

Based on sending the data request to the plurality of servers 202a to 202g, the UE 206 receives data or data packets from the plurality of servers 202a to 202g, as depicted in FIG. 2C. The UE 206 might or might not receive the data or data packets from all the plurality of servers 202a to 202g for which the data request has been sent. The data or data packets received from the plurality of servers 202a to 202g may be related to the one or more applications. The plurality of servers 202a to 202g from which the UE 206 has received the data packets are the available servers. In the scenario depicted in FIG. 2C, the first data packet received by the UE 206 (that is, the data packet received first in order among the data packets received from the plurality of servers 202a to 202g) is from server 202a, which may be therefore designated a first server 202a. Based on receiving the first data packet from the first server 202a, as depicted in FIG. 2C, the UE 206 accepts the first data packet and other data packets from the first server 202a. The UE 206 rejects/drops the data packets that have been received from the other servers 202 (202b to 202g). Thus, the UE 206 manages the multipath communication with the plurality of servers 202a to 202g by exploiting the availability of the plurality of servers 202a to 202g, and selectively communicating with the first server 202a which has demonstrated the lowest end-to-end latency.

Consider an example scenario, wherein the UE 206 identifies the trigger initiated by an application to resolve an example domain A (for example: www.abc.com), wherein the UE 206 supports the network interfaces such as, an LTE network, and Wi-Fi. In such a scenario, the UE 206 sends the request to the DNS server 204 for the IP addresses of a plurality of servers 202 associated with the domain A. The UE 206 receives five IP addresses of five servers 202 associated with the domain A, from the DNS server 204, and thereby acquires the IP addresses. The UE 206 stores the IP addresses of the five servers in the DNS cache 408 with respect to the domain A and/or the application.

When the application wants to perform a flow with one or more servers 202 with respect to the domain A, the UE 206 fetches the IP addresses of the five servers 202 associated with the domain A and sends the data request to the five servers substantially simultaneously. In an example, the UE 206 may send the data request to the five servers 202 over the LTE network. In another example, the UE 206 may send the data request to the five servers 202 over the LTE network and the Wi-Fi. In response to the sent data request, the UE 206 receives the data packets from the five servers. In an example herein, consider that the UE 206 accepts the data packets from a second server of the five servers, which have been received first. The UE 206 rejects/drops the data packets received from first, third, fourth, and fifth servers. Thus, end-to-end latency is reduced.

Embodiments herein enable the UE 206 to manage the multipath communication based on proxy based addresses, while operating in the asynchronous redundant multipath mode.

The UE 206 pre-fetches a list of proxy addresses from an enabler server for the one or more applications. The list of proxy addresses may include the IP addresses corresponding to proxy servers supported by the plurality of servers 202a to 202g. The proxy server may be the node or entity, which enables the multipath communication. The enabler server determines if the particular UE may be given with the access for proxy server. The UE 206 may send a request to the enabler server for the proxy addresses of the proxy servers and the enabler server may respond to the request of the UE 206 by providing the proxy addresses of the proxy servers. The UE 206 stores the received IP addresses.

When the UE 206 wants to perform a flow with the plurality of servers 202a to 202g using the one or more applications, the UE 206 fetches the stored proxy addresses. The UE 206 sends the data request to the proxy servers corresponding to the received proxy addresses. The data request may be the MP_CAPABLE request. Based on sending the data request to the plurality of servers 202a to 202g, the UE 206 receives the data packets from the proxy servers. The data packets received from the proxy servers may be related to the one or more applications. The UE 206 may or may not receive the data packets from all the proxy servers for which the data request has been sent. The UE 206 accepts the data packets from the proxy server that have been received first. The UE 206 rejects the data packets that have been received from the other proxy servers.

Embodiments herein enable the UE 206 to manage the multipath communication using a socket 410, while operating in the asynchronous redundant multipath mode.

The UE 206 receives the plurality of IP addresses of the plurality of servers 202a to 202g corresponding to a domain from the DNS server 204, in response to sending the request to the DNS server 204 for the IP addresses related to the domain. The UE 206 selects one or more IP addresses from the received plurality of IP addresses using the socket 410 (see FIG. 4) for the one or more applications for which the flow is to be performed. The socket 410 (see FIG. 4) may be a software module within a network node of the UE 206 that serves as an endpoint for sending the data request and receiving the data across the network interfaces. In an embodiment, the socket may override the one or more applications with a new connect system call. An example prototype of the new connect system call (armconnect) may be represented as:

> int armconnect (int sockfd, const struct sockaddr[ ]
> *addrs, uint addrcount, socklen t[ ] addrlen)
> wherein "sockfd" represents a file descriptor referred by
> the socket, "addrs[ ]" represents the list of IP address,
> addrcount represents the count of address to be connected, and addrlen[ ] represents the length of respective addresses.

The UE 206 sends the data request to one or more servers 202 corresponding to the selected one or more IP addresses, as depicted in FIG. 2B. Based on sending the data request to the one or more servers 202, the UE 206 receives the data/data packets from the one or more servers 202, as depicted in FIG. 2C. The data/data packets received from the one or more servers may be related to the one or more applications. Based on receiving the data packets from the one or more servers, the UE 206 accepts the data packets from a server 202 that have been received first. The UE 206 rejects the data packets that have been received from the other servers 202.

FIGS. 2A, 2B, and 2C show exemplary components of the communication system 200, but it is to be understood that other embodiments are not limited thereto. In other embodiments, the communication system 200 may include less or more number of components. Further, the labels or names of the components are used only for illustrative purpose and does not limit the scope of the embodiments herein. One or more components can be combined together to perform same or substantially similar function in the communication system 200.

Figure 3:
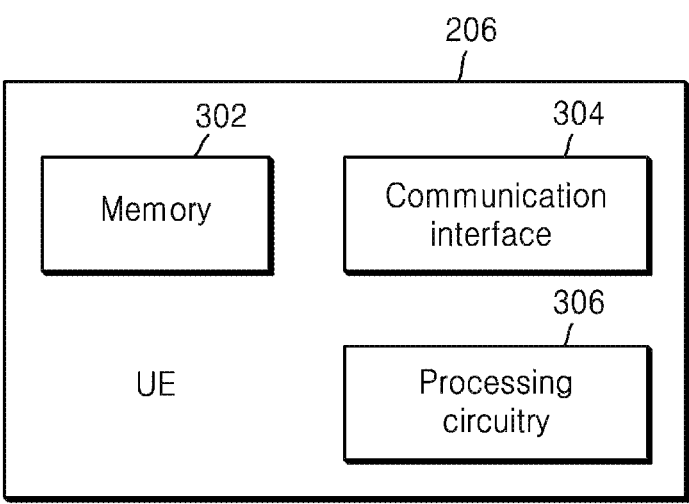
FIG. 3 is a block diagram depicting various components of a User Equipment (UE) to manage multipath communication by exploiting availability of a plurality of servers, according to exemplary embodiments as disclosed herein.

FIG. 3 is a block diagram depicting various components of the UE 206 to manage the multipath communication by exploiting the availability of a plurality of servers 202, according to exemplary embodiments as disclosed herein.

The UE 206 includes a memory 302, a communication interface 304, and a processing circuitry 306. The UE 206 may also include a transceiver, a signal processing circuitry, an Input/Output module, a display, and so on (not shown).

The memory 302 may include at least one type of storage medium, from among a flash memory type storage medium, a hard disk type storage medium, a multi-media card micro type storage medium, a card type memory (for example, an SD or an XD memory), random-access memory (RAM), static RAM (SRAM), read-only memory (ROM), electrically erasable programmable ROM (EEPROM), programmable ROM (PROM), a magnetic memory, a magnetic disk, or an optical disk. The memory 302 may store at least one of the one or more applications, the plurality of IP addresses of the plurality of servers 202 corresponding to a domain, the data request, the data packets, and so on.

The memory 302 may also store a multipath communication manager 400, which may be executed by the processing circuitry 306 to manage the multipath communication with the plurality of server 202 by exploiting the availability of the plurality of servers 202.

The memory 302 may also store a neural network, which may be trained and processed by the processing circuitry 306 to determine the behavior of the applications, which may be used to enable the asynchronous redundant multipath mode. The neural network may comprise a plurality of layers. Each layer has a plurality of weight values and performs a layer operation through calculation of a previous layer and an operation of a plurality of weights/coefficients. The neural network may be trained using at least one learning method to determine the behavior of the one or more applications. Examples of the learning method may be, but are not limited to, supervised learning, unsupervised learning, semi-supervised learning, Reinforcement Learning, regression-based learning, and so on. A function associated with the learning method may be performed through the non-volatile memory, the volatile memory, and the processing circuitry 306. The processing circuitry 306 enables the asynchronous redundant multipath mode based on the behavior of the one or more applications, which have been determined in accordance with a predefined operating rule of the neural network stored in the non-volatile memory and the volatile memory. Here, being provided through learning means that, by applying the learning method to training dataset (for example herein: the behavior of the one or more applications determined based on the global mode, the socket options, the control mode, the auto-driven mode, or the like), a predefined operating rule or AI model of a desired characteristic is made. The behavior of the one or more applications may be determined in the UE 206 itself in which the learning according to an embodiment is performed, and/or may be implemented through a separate external entity.

The communication interface 304 may be configured to enable the UE 206 with at least one of the DNS server 204, the one or more servers 202, and so on using the one or more network interfaces.

The processing circuitry 306 may be at least one of, without limitation, a single processor, a plurality of processors, multiple homogeneous cores, multiple heterogeneous cores, multiple Central Processing Units (CPUs) of different kinds, and so on. The one or a plurality of processors may be a general purpose processor, such as a central processing unit (CPU), an application processor (AP), or the like, a graphics-only processing unit such as a graphics processing unit (GPU), a visual processing unit (VPU), and/or an Artificial Intelligence (AI)-dedicated processor such as a neural processing unit (NPU).

The processing circuitry 306 may be configured to enable the asynchronous redundant multipath mode in the UE 206 for managing the multipath communication with the one or more servers 202. The processing circuitry 306 may use at least one of, without limitation, the global mode/method, the socket options, the control method, the auto-driven method, the neural network, and so on, to enable the asynchronous redundant multipath mode in the UE 206.

The processing circuitry 306 may also be configured to manage the multipath communication with the one or more servers 202 by exploiting the availability of the plurality of servers 202, based on enabling the asynchronous redundant multipath mode. The processing circuitry 306 may execute the multipath communication manager 400 to manage the multipath communication with the one or more servers 202.

Figure 4:
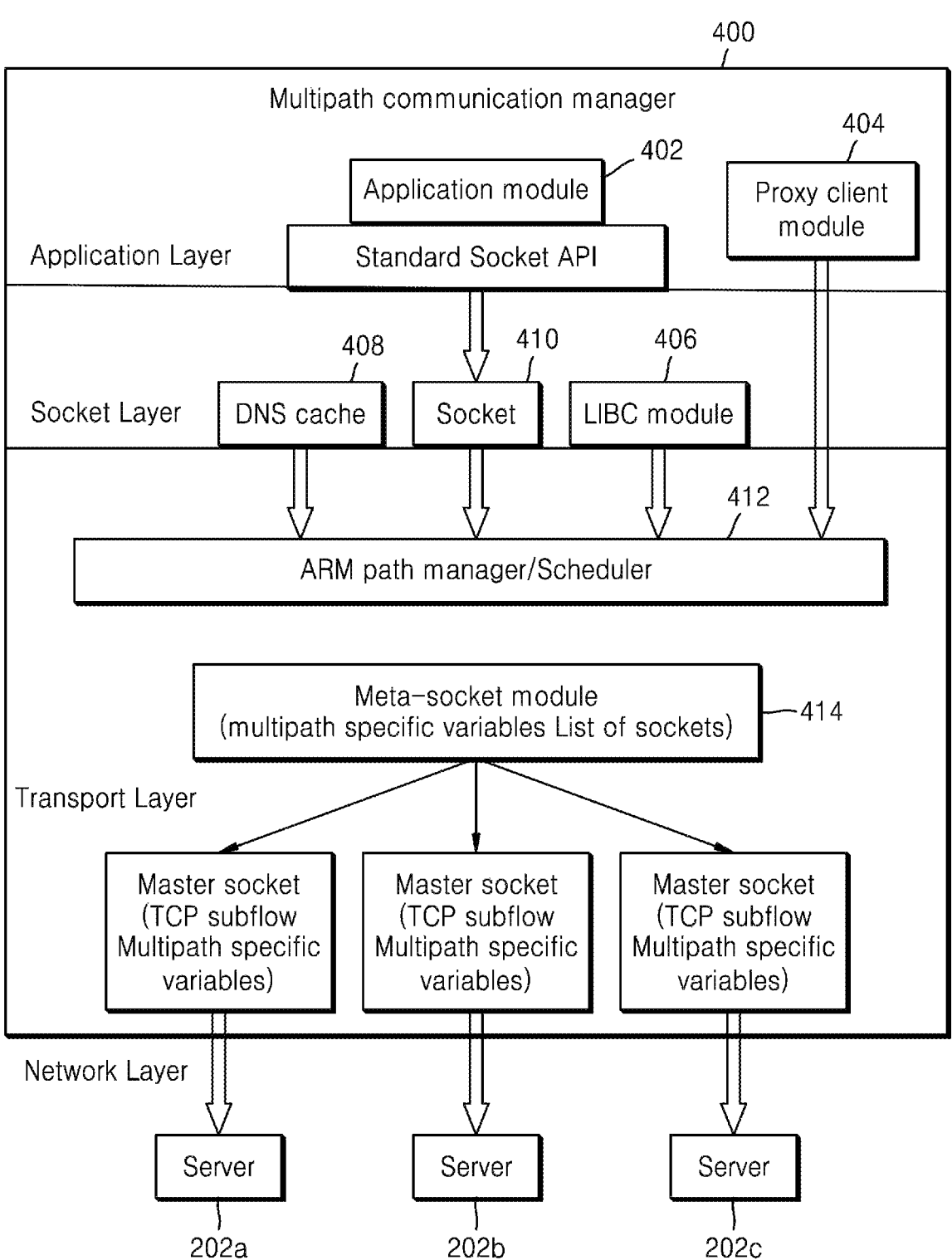
FIG. 4 is a block diagram depicting a multipath communication manager performable on the UE to manage the multipath communication, according to exemplary embodiments as disclosed herein.

As depicted in FIG. 4, the multipath communication manager 400 in the UE 206 includes an application module 402 coupled with a standard socket Application Programming Interface (API) (at an application layer), the proxy client module 404 (at the application layer), a LIBC module 406 (at a socket layer), the DNS cache/DNS cache module 408 (at a socket layer), the socket/socket module 410 (at a socket layer), an asynchronous redundant multipath manager (ARM) path manager module/scheduler module 412 (at a transport layer), and a meta-socket module 414 (at a transport layer).

The application module 402 includes the one or more applications, which may be used by the UE 206 to perform the flow with the one or more servers 202. The one or more applications may initiate the trigger to resolve the one or more domains for performing the one or more flows with the one or more servers 202.

The proxy client module 404 may be configured to receive and store the list of proxy addresses received from the enabler server.

The LIBC module 406 may be configured to send the request to the DNS server 204 for the IP addresses related to the one or more domains, on initiating the trigger by the one or more applications to resolve the one or more domains. The LIBC module 406 may also be configured to receive the plurality of IP addresses of the plurality of servers 202 corresponding to the requested one or more domains from the DNS server 204. The LIBC module 406 stores the received plurality of IP addresses of the plurality of servers 202 corresponding to the one or more domains in the DNS cache 408.

The socket 410 may be configured to select the one or more IP addresses from the plurality of IP addresses received by the LIBC module 406, with which the one or more applications may asynchronously connect.

The ARM path manager/scheduler module 412 may be configured to manage the multipath communication with the one or more servers 202. The ARM path manager module 412 detects events initiated by the various modules such as, the application module 402, the proxy client module 404, the LIBC module 406 and the DNS cache 408, the socket 410, and so on. In an example herein, the events may indicate at least one of, without limitation, initiating, by the one or more applications, the trigger to resolve the one or more domains, fetching, by the proxy client module 404, the proxy addresses related to the proxy addresses associated with the one or more domains, fetching, by the LIBC module 406, the IP addresses of the servers 202 associated with the one or more domains, selecting, by the socket 410, the plurality of IP addresses of the plurality of servers 202 with which the one or more applications want to connect, and so on.

Based on detecting an event initiated by a module, the ARM path manager module 412 creates independent master sockets. The master sockets may be created for the plurality of servers 202 corresponding to the plurality of IP addresses of the domain to which an application want to connect. Each of the master sockets may be a primary socket, which corresponds to a first subflow in the multipath communication between the UE 206 and the plurality of servers 202. Each of the master sockets may include a Transport Control Protocol (TCP) subflow and multipath specific variables. The ARM path manager module 412 may create additional slave sockets in a kernel module (not shown), based on creating the master sockets. The additional slave sockets may correspond to multiple subflows.

Based on creating the master sockets, the ARM path manager module 412 may receive the request to perform the flow from at least one of the proxy client module 404, the LIBC module 406, and the socket 410. The request may include the plurality of IP addresses of the plurality of servers 202 corresponding to the domain. Based on the received request, the ARM path manager module 412 may trigger or create or modify the data request. The data request may include the MP_CAPABLE request. The ARM path manager module 412 sends the data request to the plurality of servers 202 corresponding to the received plurality of IP addresses independently, through the meta-socket module 414. The ARM path manager module 412 receives the data packets from the plurality of servers 202 in response to the sent data request. The ARM path manager module 412 provides the data packets to the meta-socket module 414.

The meta-socket module 414 may be a socket structure configured to accept the data packets from the server 202 which have been received first and processes the accepted data packets for further purpose. The meta-socket module 414 rejects/drops the data packets that have been received from the other servers 202. The meta-socket module 414 also re-orders incoming data/data packets at a connection level and schedules outgoing data/data packets to the subflows. For example, when receiving the same data/data packets from the multiple master sockets, the meta-socket module 414 may reorder the incoming data packets and may provide the reordered data packets to the application.

Thus, managing the multipath communication by exploiting the availability of the plurality of servers 202 may reduce the end-to-end latency.

In an embodiment, the latency or round trip time (RTT) may be calculated as:

$$RTT = \frac{1}{TP}\sqrt{\frac{3}{2\cdot\rho}}$$

wherein 'TP' represents throughput or bandwidth, and 'ρ' represents probability of packet loss. From the above equation, it is understood that the RTT/latency is inversely proportional to the packet loss. If 'N' different servers 202 are connected, the expected RTT/latency may be computed as:

$$E[RTT] = \min_{\forall i \in N_i}\sqrt{\frac{1}{\rho_i}}$$

From the above equation, it is understood that embodiments herein provide the reduced latency at any duration during the multipath communication between the UE 206 and the servers 202.

FIGS. 3 and 4 show exemplary components of the UE 206, but it is to be understood that other embodiments are not limited thereon. In other embodiments, the UE 206 may include less or more number of components. Further, the labels or names of the components are used only for illustrative purpose and does not limit the scope of the embodiments herein. One or more components can be combined together to perform same or substantially similar function in the UE 206.

Figure 5:
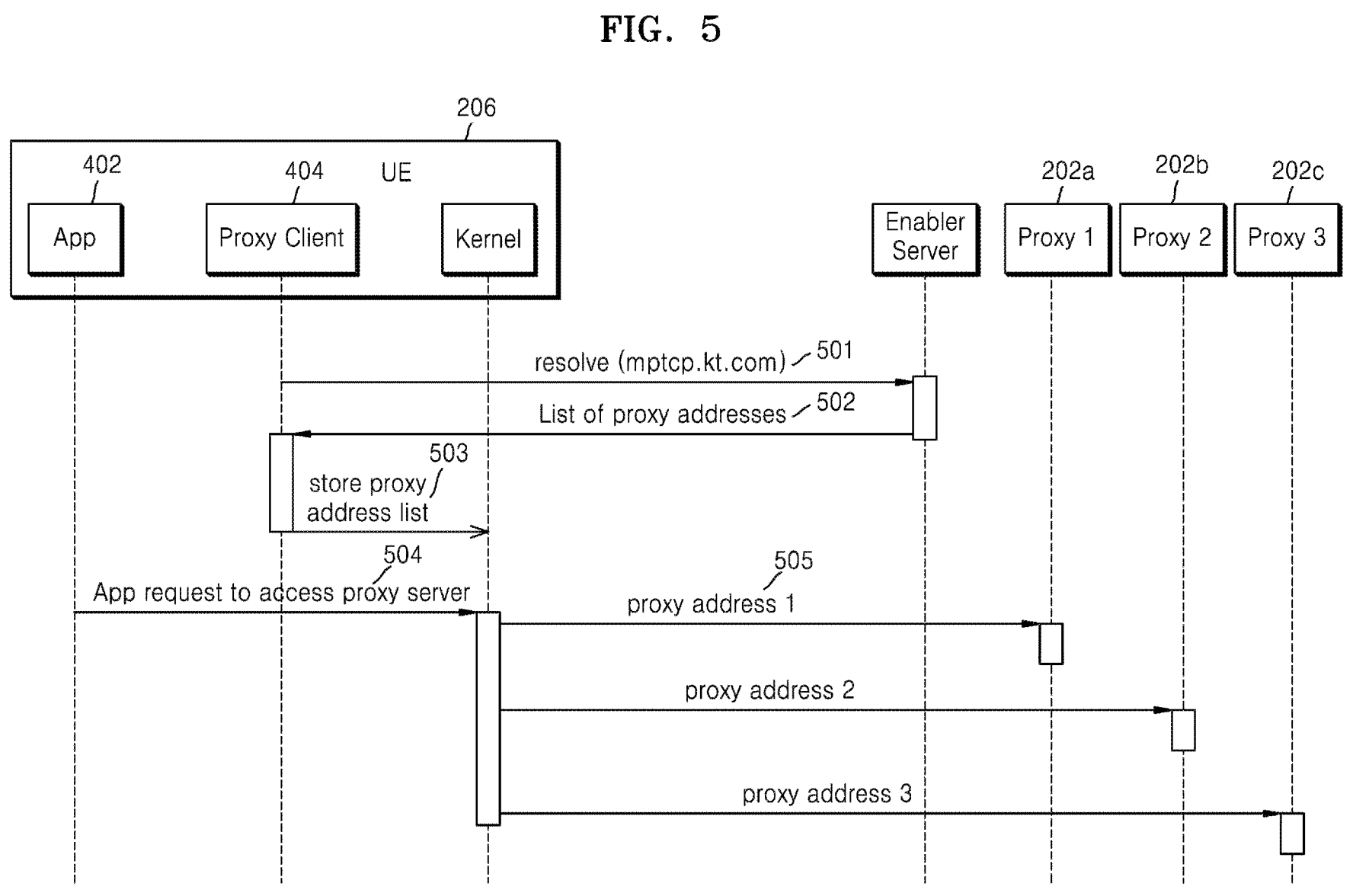

FIG. 5 is a sequence diagram depicting a method for managing the multipath communication based on the proxy addresses, according to exemplary embodiments as disclosed herein.

At operation 501, the UE 206 sends the request to the enabler server for resolving a domain name (i.e., to receive the proxy addresses/IP addresses for the domain).

At operation 502, the UE 206 receives the list of proxy addresses from the enabler server, in response to the sent request. In an example herein, the list of proxy addresses may include three proxy/IP addresses, a proxy address 1 corresponding to a proxy server 1 202a, a proxy address 2 corresponding to a proxy server 2 202b, and a proxy address 3 corresponding to a proxy server 3 202c. At operation 503, the UE 206 stores the list of proxy addresses in the proxy client module 404.

At operation 504, the UE 206 identifies a request triggered by the application 402 to access/connect to one or more proxy servers. At operation 505, the UE 206 fetches the stored three proxy addresses and sends the data request to the three proxy servers 202a to 202c corresponding to the fetched three proxy addresses substantially simultaneously.

The UE 206 may receive the data/data packets from the three proxy servers 202a to 202c in response to the sent request. The UE 206 accepts the data packets from the proxy server that have been received first. The UE 206 drops the data packets that have been received from the other proxy servers. For example, the UE 206 may receive a data packet including a data (or information) from the proxy server 1 202a first. The UE 206 may then receive data packets including the same data (or data including the same information) from the proxy server 2 202b and the proxy server 3 202c. The UE 206 may accept the data packet that have been received first, from the proxy server 1 202a. The UE 206 may provide the data included in the data packet to the application. The UE 206 may drop the data packets that have been received from the proxy server 2 202b and the proxy server 3 202c.

Figure 6:
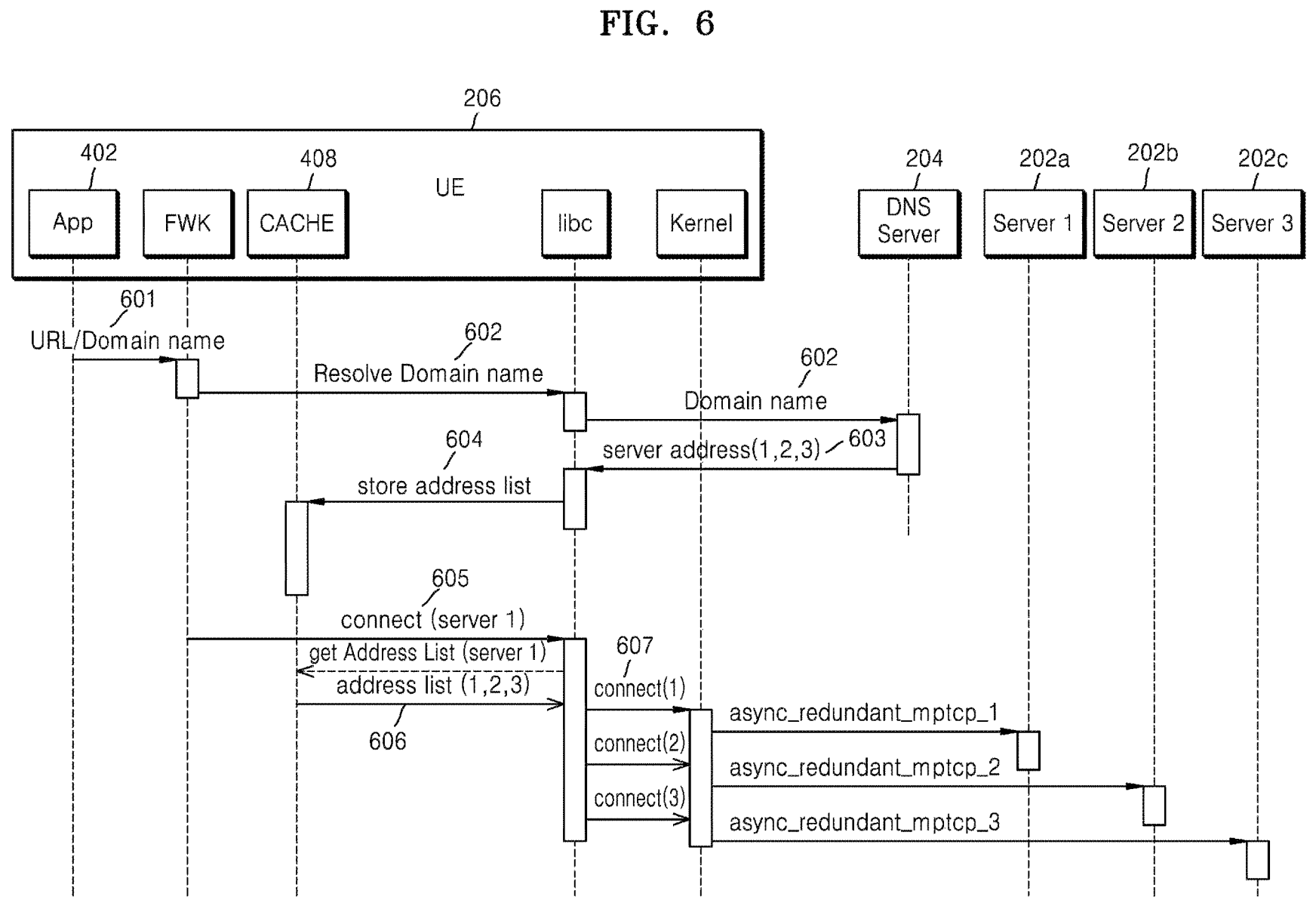

FIG. 6 is a sequence diagram depicting a method for managing the multipath communication using the DNS cache, according to exemplary embodiments as disclosed herein.

At operation 601, the UE 206 identifies a trigger initiated by the application 402 to resolve a domain/domain name. At operation 602, the UE 206 sends the request to the DNS server 204 for resolving the domain (i.e., for the IP addresses of the servers 202 that have been associated with the requested domain). At operation 603, the DNS server 204 identifies the plurality of IP addresses of the plurality of servers 202a to 202c corresponding to the requested domain from the database. The DNS server 204 communicates the identified plurality of IP addresses of the plurality of servers 202a to 202c corresponding to the requested domain to the UE 206. In an example, the DNS server 204 may send three IP addresses of three servers 202a to 202c that have been associated with the requested domain. At operation 604, the UE 206 stores the received three IP addresses in the DNS cache 408.

At operation 605, the UE 206 identifies that the application 402 tries to connect to a server related to the specific domain for a flow. At operation 606, the UE 206 fetches the three IP addresses stored in the DNS cache 408 for the same domain. At operation 607, the UE 206 sends the data request to the three servers 202a to 202c that correspond to the fetched three IP addresses, substantially simultaneously. The UE 206 may receive the data/data packets from the three servers 202a to 202c in response to the sent request. The UE 206 accepts the data packets from the server 202 that have been received first. The UE 206 drops the data packets that have been received from the other servers 202. For example, the UE 206 may receive a data packet including a data (or information) from the server 1 202a first. The UE 206 may then receive data packets including the same data (or data including the same information) from the server 2 202b and the server 3 202c. The UE 206 may accept the data packet that have been received first, from the server 1 202a. The UE 206 may provide the data included in the data packet to the application. The UE 206 may drop the data packets that have been received from the server 2 202b and the server 3 202c.

Figure 7:
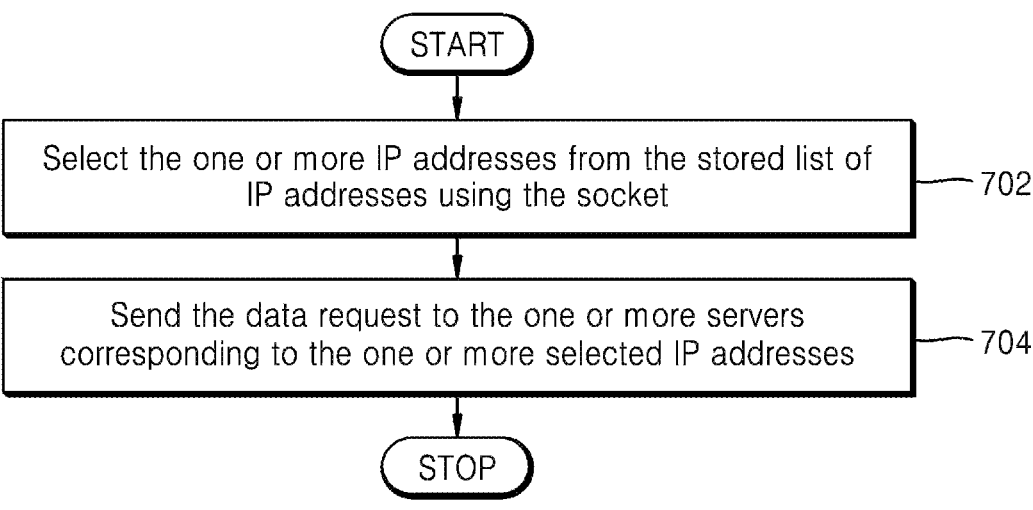
FIG. 7 is a flow diagram depicting a method for managing the multipath communication using a socket, according to exemplary embodiments as disclosed herein.

FIG. 7 is a flow diagram depicting a method for managing the multipath communication using the socket, according to exemplary embodiments as disclosed herein.

At operation 702, the UE 206 selects the one or more IP addresses from the stored list of IP addresses using the socket. The one or more IP addresses may be the IP addresses with which the application wants to connect for the flow.

At operation 704, the UE 206 sends the data request to the one or more servers 202 corresponding to the one or more selected IP addresses. The UE 206 may receive the data/data packets from the one or more servers 202 in response to the sent request. The UE 206 accepts the data packets from the server 202 that have been received first. The UE 206 drops the data packets that have been received from the other servers 202.

FIG. 8 is an example diagram depicting a method for managing the multipath communication, according to embodiments as disclosed herein.

Embodiments herein enable the UE 206 to send the data requests to the plurality of servers 202 substantially simultaneously, for performing the flow, as depicted in FIG. 8.

As depicted in FIG. 8, at operation 802, the method includes sending, by the UE 206, the request to the DNS server 204, for at least one of IP addresses corresponding to a domain. At operation 804, the method incudes receiving, by the UE 206, a plurality of IP addresses corresponding to a plurality of servers 202 associated with the requested domain from the DNS server 204.

At operation 806, the method includes sending, by the UE 206, a data request to the plurality of servers 202 corresponding to the received plurality of IP addresses. The data request may be sent to the plurality of servers 202 substantially simultaneously, or by sending the data request to at least one server and indicating the plurality of IP addresses for the plurality of servers 202 in the data request. In another example, sending the data request to the plurality of servers 202 may include sending a plurality of data requests each to a respective server of the plurality of servers 202, or sending a single data request to at least one server indicating the plurality of IP addresses for the plurality of servers 202. The UE 206 may send the data request to the plurality of servers 202 using the single network interface. Alternatively, the UE 206 may send the data request to the plurality of servers 202 using the plurality of network interfaces. The data request may include the MP_CAPABLE request, which indicates that the UE 206 supports multipath communication.

Embodiments herein enable the UE 206 to receive the data packets from the plurality of servers 202 in response to the sent request and to manage the received data packets, as depicted in FIG. 8.

As depicted in FIG. 8, at operation 808, the method includes receiving, by the UE 206, a data packet including a data from a server of the plurality of servers 202 first, in response to the data request.

At operation 810, the method includes accepting, by the UE 206, the data packet from the server of the plurality of servers 202 that have been received first. At operation 812, the method includes rejecting, by the UE 206, data packets including the data that have received from other servers of the plurality of servers 202.

The various actions in the method depicted in FIG. 8 may be performed in the order presented, in a different order, or simultaneously. Further, in some embodiments, some actions depicted in FIG. 8 may be omitted.

Embodiments herein enable a User Equipment (UE) to manage the multipath communication with one or more servers in an asynchronous redundant multipath mode. In the asynchronous redundant multipath mode, the UE manages the multipath communication by exploiting availability of multiple servers. Thus, ultra-low latency is provided for the UE.

In the asynchronous redundant multipath mode, the UE sends a data request (a MP_CAPABLE request) asynchronously to multiple servers. The data request may be homogeneous (i.e., the data request may be sent to the multiple servers using a single network interface). Alternatively, the data request may be heterogeneous (i.e., the data request may be sent to the multiple servers using multiple network interfaces).

Embodiments herein enable the UE to receive data from the multiple servers in response to the sent data request. The received data from one server/in one path may be completely independent of the other. Thus, the data received from multiple servers, which ever races first has been accepted by the UE and the other data has been dropped by the UE.

Embodiments herein enables the UE to asynchronously create multiple subflows in the multipath communication for better user experience and network utilization.

Embodiments herein may enable the UE to manage the multipath communication in the asynchronous redundant multipath mode for the following types of applications:

Elastic application: The UE may include the one or more applications that are sensitive to the latency. Such applications do not require higher bandwidth but it is preferable for the latency to be as low as possible (for example: Session Initiation Protocol (SIP) control messages). Consider an example scenario, wherein multiple SIP servers are present in a communication system. In such a scenario, the UE may send a SIP request to the multiple SIP servers and obtain a response from the minimal loaded SIP server.

Real-time application: Online gaming applications keep posting the data in smaller bytes. However, if the delay is high, then the game performance may be highly impacted. Thus, for the online gaming applications, the data rate may be traded-off with the latency for the better user experience.

Autonomous driving applications: The autonomous driving applications prefer a lowest possible latency. Thus, embodiments herein enable the UE to manage the multipath communication in the asynchronous redundant multipath mode for Ultra-reliable low-latency communication (uRLLC) applications.

Embodiments herein enable the UE to automatically classify the applications into one or more types and to enable the asynchronous redundant multipath mode only for the applications that are sensitive to latency.

Figure 9:
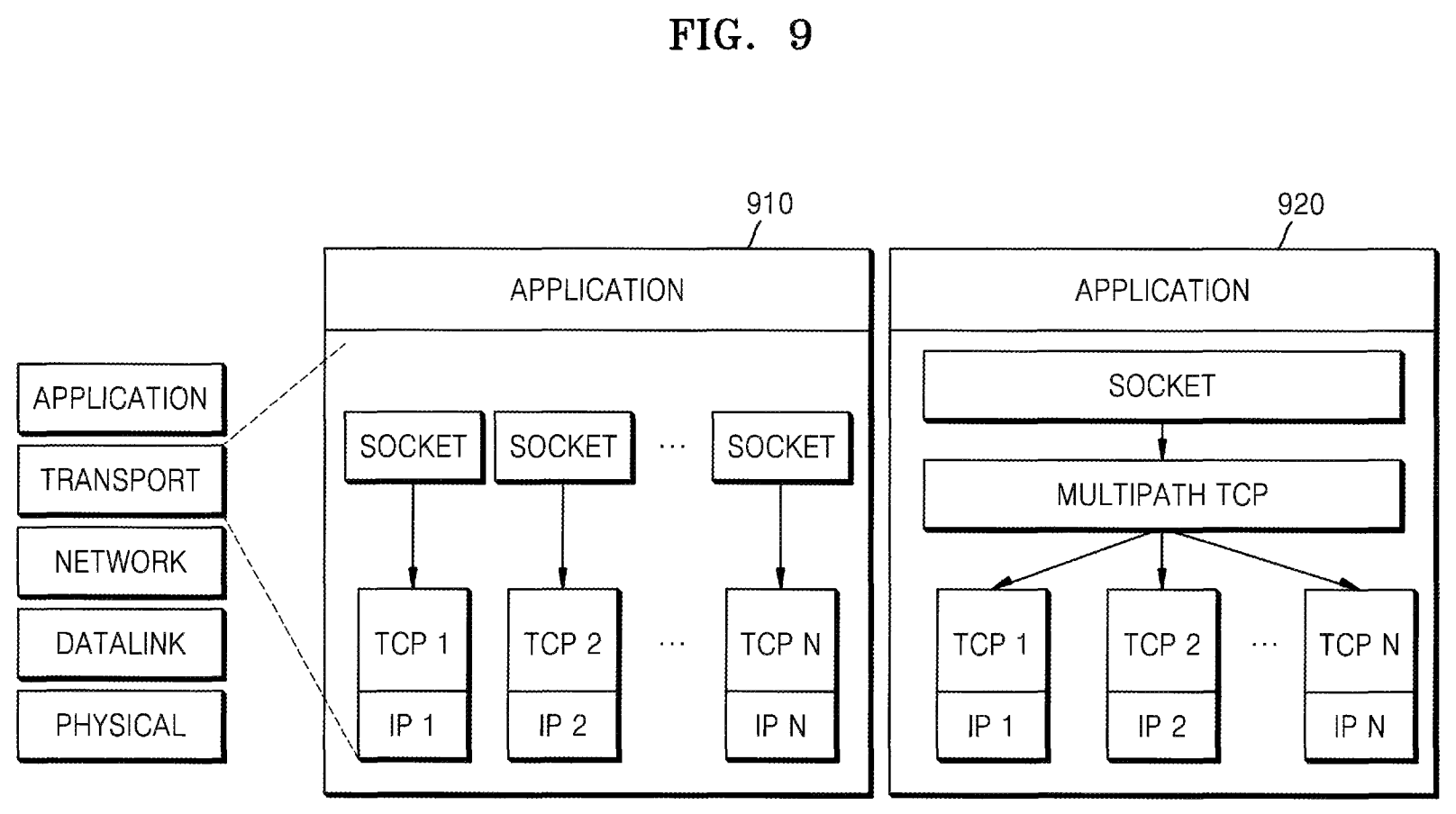

FIG. 9 is a diagram depicting socket mapping in Transport Control Protocol 910 and multipath TCP 920, according to exemplary embodiments as disclosed herein.

The present disclosure may be application agnostic (as depicted in FIG. 9). The MP CAPABLE is sent across various available server independently and the data is shared to the META SOCKET layer. The packet which reaches first is processed by the META SOCKET and the other packets are dropped. The application is unaware of a lower layer socket and the application may connect to a master socket. In the present disclosure, a meta socket and a slave socket may be responsible for managing data traffic and reassembling the data traffic. Thus, the UE may download any application and may initiate/launch the application without requiring any modifications.

The embodiments disclosed herein may be implemented through at least one software program running on at least one hardware device and performing network management functions to control the elements. The elements shown in FIGS. 2A-4, may be at least one of a hardware device, or a combination of hardware device and software module.

The embodiments disclosed herein describe methods and systems for managing multipath communication. Therefore, it is understood that the scope of the protection is extended to a program and in addition to a non-transitory computer readable storage device or recording medium having data recorded therein, such data including program code such as computer-readable instructions executable by a processor or other processing circuitry for implementation of one or more operations of the method. In this manner, the program may execute on a server, mobile device, or any other suitable programmable device. The method may be implemented through or together with a software program written in, e.g., Very high speed integrated circuit Hardware Description Language (VHDL) another programming language, or implemented by one or more VHDL or several software modules being executed on at least one hardware device. The hardware device may be any kind of portable device that may be programmed. The device may also include means which could be e.g., hardware means like e.g., an ASIC, or a combination of hardware and software means, e.g., an ASIC and an FPGA, or at least one microprocessor and at least one memory with software modules located therein. The method embodiments described herein could be implemented partly in hardware and partly in software. Alternatively, embodiments may be implemented on different hardware devices, e.g., using a plurality of CPUs.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein may be practiced with modification within the spirit and scope of the embodiments as described herein.

What is claimed is:

1. A method for managing multipath communication by a user equipment (UE), the method comprising:

using an output of a neural network to determine whether to enable an asynchronous redundant multipath mode, wherein the asynchronous redundant multipath mode is a mode that transmits redundant data asynchronously to a plurality of servers, and wherein the neural network is trained to generate an output indicating whether to enable the asynchronous redundant multipath mode based on an input comprising at least one of a file system variable, a socket option, an allowed list of applications, or a maximum segment size of an application, and based on determining the asynchronous redundant multipath mode is to be enabled:

acquiring a plurality of network addresses respectively corresponding to a plurality of servers associated with a domain;

enabling the asynchronous redundant multipath mode;

creating a plurality of independent master sockets corresponding to the plurality of servers associated with the domain, wherein each of the master sockets includes a transport control protocol (TCP) subflow and multipath specific variables;

based on creating the master sockets, independently and asynchronously sending a data request to the plurality of servers associated with the domain based on the acquired plurality of network addresses in the asynchronous redundant multipath mode, wherein the data request includes a multipath capable (MP-_CAPABLE) request, and wherein the multipath capable request indicates the UE supports multipath communication;

receiving a first data packet transmitted from a server of the plurality of servers associated with the domain in response to the data request, the first data packet being received first in order among a plurality of data packets transmitted from the plurality of servers associated with the domain in response to the data request;

accepting the first data packet; and rejecting data packets, from among the plurality of data packets, transmitted from each server of the plurality of servers associated with the domain other than the server that transmitted the first data packet.

2. The method of claim 1, wherein the sending the data request comprises sending the data request over a multipath communication link using at least one of Multipath Transmission Control Protocol (MPTCP) communication, Multipath User Datagram Protocol (MPUDP) communication, and Multipath Quick UDP Internet Connections (MPQUIC) communication.

3. The method of claim 1, wherein the acquiring the plurality of network addresses comprises:

sending a request to an address lookup server for at least one network address corresponding to the domain;

receiving the plurality of network addresses from the address lookup server; and storing the received plurality of network addresses.

4. The method of claim 1, wherein the sending the data request comprises sending the data request to each of the plurality of servers associated with the domain substantially simultaneously.

5. The method of claim 1, wherein the sending the data request comprises sending the data request to at least one server of the plurality of servers associated with the domain, wherein the data request indicates the acquired plurality of network addresses.

6. The method of claim 1, wherein the sending the data request comprises:

selecting at least one network address from the acquired plurality of network addresses using a socket, the at least one network address corresponding to at least one server of the plurality of servers associated with the domain;

preparing the data request to be sent to the at least one server using the socket; and sending the data request to the at least one server.

7. A user equipment (UE) for managing multipath communication comprising:

at least one communication interface;

at least one memory storing one or more instructions; and processing circuitry configured to execute the plurality of instructions to:

use an output of a neural network to determine whether to enable an asynchronous redundant multipath mode, wherein the asynchronous redundant multipath mode is a mode that transmits redundant data asynchronously to a plurality of servers, and wherein the neural network is trained to generate an output indicating whether to enable the asynchronous redundant multipath mode based on an input comprising at least one of a file system variable, a socket option, an allowed list of applications, or a maximum segment size of an application, and based on determining the asynchronous redundant multipath mode is to be enabled:

acquire a plurality of network addresses respectively corresponding to a plurality of servers associated with a domain, enable the asynchronous redundant multipath mode, create a plurality of independent master sockets corresponding to the plurality of servers associated with the domain, wherein each of the master sockets includes a transport control protocol (TCP) subflow and multipath specific variables, based on creating the master sockets, independently and asynchronously send, through the at least one communication interface, a data request to the plurality of servers associated with the domain based on the acquired plurality of network addresses in the asynchronous redundant multipath mode, wherein the data request includes a multipath capable (MP-_CAPABLE) request, and wherein the multipath capable request indicates the UE supports multipath communication, receive a first data packet transmitted from a server of the plurality of servers associated with the domain in response to the data request, the first data packet being received first in order among a plurality of data packets transmitted from the plurality of servers associated with the domain in response to the data request, accept the first data packet, and reject data packets, from among the plurality of data packets, transmitted from each server of the plurality of servers associated with the domain other than the server that transmitted the first data packet.

8. The UE of claim 7, wherein the processing circuitry is further configured to execute the one or more instructions to send the data request over a multipath communication link using at least one of Multipath Transmission Control Protocol (MPTCP) communication, Multipath User Datagram Protocol (MPUDP) communication, and Multipath Quick UDP Internet Connections (MPQUIC) communication.

9. The UE of claim 7, wherein the processing circuitry is further configured to execute the one or more instructions to cause the UE to acquire the plurality of network addresses by:

sending, through the at least one communication interface, a request to an address lookup server for at least one network address corresponding to the domain;

receiving the plurality of network addresses from the address lookup server; and storing the received plurality of network addresses in the at least one memory.

10. The UE of claim 7, wherein the processing circuitry is further configured to execute the one or more instructions to send the data request to each of the plurality of servers associated with the domain substantially simultaneously.

11. The UE of claim 7, wherein the processing circuitry is further configured to execute the one or more instructions to send the data request to at least one server of the plurality of servers associated with the domain, wherein the data request indicates the acquired plurality of network addresses.

12. A non-transitory computer-readable recording medium having instructions stored therein, which when executed by at least one processor of a user equipment (UE), cause the at least one processor to execute a method of managing multipath communication by the UE, the method comprising:

using an output of a neural network to determine whether to enable an asynchronous redundant multipath mode, wherein the asynchronous redundant multipath mode is a mode that transmits redundant data asynchronously to a plurality of servers, and wherein the neural network is trained to generate an output indicating whether to enable the asynchronous redundant multipath mode based on an input comprising at least one of a file system variable, a socket option, an allowed list of applications, or a maximum segment size of an application, and based on determining the asynchronous redundant multipath mode is to be enabled:

acquiring a plurality of network addresses respectively corresponding to a plurality of servers associated with a domain;

enabling the asynchronous redundant multipath mode;

creating a plurality of independent master sockets corresponding to the plurality of servers associated with the domain, wherein each of the master sockets includes a transport control protocol (TCP) subflow and multipath specific variables;

based on creating the master sockets, independently and asynchronously sending, by the UE, a data request to the plurality of servers associated with the domain based on the acquired plurality of network addresses in the asynchronous redundant multipath mode, wherein the data request includes a multipath capable (MP_CAPABLE) request, and wherein the multipath capable request indicates the UE supports multipath communication;

receiving a first data packet transmitted from a server of the plurality of servers associated with the domain in response to the data request, the first data packet being received first in order among a plurality of data packets transmitted from the plurality of servers associated with the domain in response to the data request;

accepting the first data packet; and rejecting data packets, from among the plurality of data packets, transmitted from each server of the plurality of servers associated with the domain other than the server that transmitted the first data packet.

13. The non-transitory computer-readable recording medium of claim 12, wherein the sending the data request comprises sending the data request over a multipath communication link using at least one of Multipath Transmission Control Protocol (MPTCP) communication, Multipath User Datagram Protocol (MPUDP) communication, and Multipath Quick UDP Internet Connections (MPQUIC) communication.

14. The non-transitory computer-readable recording medium of claim 12, wherein the sending the data request comprises sending the data request to each of the plurality of servers associated with the domain substantially simultaneously.

15. The non-transitory computer-readable recording medium of claim 12, wherein the sending the data request comprises sending the data request to at least one server of the plurality of servers associated with the domain, wherein the data request indicates the acquired plurality of network addresses.

16. The non-transitory computer-readable recording medium of claim 12, wherein the sending the data request comprises:

selecting at least one network address from the acquired plurality of network addresses using a socket, the at least one network address corresponding to at least one server of the plurality of servers associated with the domain;

preparing the data request to be sent to the at least one server using the socket; and sending the data request to the at least one server.

17. The method according to claim 1, wherein the sending the data request comprises asynchronously sending the multipath capable (MP_CAPABLE) request to the plurality of servers associated with the domain in the asynchronous redundant multipath mode, based on the acquired plurality of network addresses.

18. The method according to claim 1, wherein the neural network is trained based on the file system variable, the socket option, the allowed list of applications, and the maximum segment size of an application.

* * * * *